(12) United States Patent
Ball

(10) Patent No.: US 7,111,875 B2
(45) Date of Patent: Sep. 26, 2006

(54) WALL HYDRANT WITH SLIP CLUTCH ASSEMBLY

(75) Inventor: William T Ball, Colorado Springs, CO (US)

(73) Assignee: WCM Industries, Inc., Colorado Springs, CO (US)

(*) Notice: Subject to any disclaimer, the term of this patent is extended or adjusted under 35 U.S.C. 154(b) by 80 days.

(21) Appl. No.: 10/978,747

(22) Filed: Nov. 1, 2004

(65) Prior Publication Data

US 2006/0108804 A1 May 25, 2006

(51) Int. Cl.
*F16L 19/06* (2006.01)

(52) U.S. Cl. .................. 285/340; 285/39; 137/360

(58) Field of Classification Search .................. 285/8, 285/39, 322, 323, 340; 137/360
See application file for complete search history.

(56) References Cited

U.S. PATENT DOCUMENTS

| | | | | | |
|---|---|---|---|---|---|
| 1,556,241 | A | * | 10/1925 | Mueller | 285/193 |
| 2,986,341 | A | * | 5/1961 | Goodrie | 239/428.5 |
| 3,014,667 | A | * | 12/1961 | McLean et al. | 239/428.5 |
| 3,390,898 | A | * | 7/1968 | Sumida | 285/34 |
| 3,429,596 | A | * | 2/1969 | Marshall | 285/340 |
| 3,679,241 | A | * | 7/1972 | Hoffmann | 285/340 |
| 4,281,857 | A | * | 8/1981 | Randall | 285/34 |
| 4,655,486 | A | * | 4/1987 | Tarnay et al. | 285/340 |
| 4,964,657 | A | * | 10/1990 | Gonzales | 285/8 |
| 5,024,419 | A | * | 6/1991 | Mulvey | 251/148 |
| 5,160,179 | A | * | 11/1992 | Takagi | 285/340 |
| 5,284,582 | A | * | 2/1994 | Yang | 210/232 |
| 5,394,572 | A | | 3/1995 | Humphreys | |
| 5,482,329 | A | * | 1/1996 | McCall et al. | 285/39 |
| 5,496,076 | A | * | 3/1996 | Lin | 285/110 |
| 5,632,303 | A | | 5/1997 | Almasy et al. | |
| 5,649,723 | A | * | 7/1997 | Larsson | 285/34 |
| 5,788,443 | A | * | 8/1998 | Cabahug | 411/385 |
| 5,813,428 | A | | 9/1998 | Almasy et al. | |
| 6,464,266 | B1 | * | 10/2002 | O'Neill et al. | 285/340 |
| 6,517,124 | B1 | * | 2/2003 | Le Quere | 285/340 |
| 6,532,986 | B1 | | 3/2003 | Dickey et al. | |
| 6,860,523 | B1 | * | 3/2005 | O'Neill et al. | 285/340 |
| 2003/0111840 | A1 | * | 6/2003 | O'Neill et al. | 285/340 |

* cited by examiner

*Primary Examiner*—James M. Hewitt

(57) ABSTRACT

A hydrant for use with a plumbing outlet pipe has a fluid passage passing from an inlet end to an outlet end and a retention body connected to the inlet end. A slip clutch adapted to contractibly receive the pipe and prevent reverse pipe movement therethrough is located within the retention body. The slip clutch comprises a retaining ring having a plurality of sloped spring fingers normally allowing pipe movement in a linkage-contracting direction but preventing reverse pipe movement.

7 Claims, 7 Drawing Sheets

WALL HYDRANT WITH SLIP CLUTCH ASSEMBLY

BACKGROUND OF THE INVENTION

This invention relates to faucet mechanisms, also known as hydrants, and more particularly to faucet mechanisms having a slip clutch assembly for connecting to an outlet pipe of a plumbing system.

Hydrants or faucets known for decades typically have an inlet fitting for connecting the inlet end of the hydrant or faucet to an outlet pipe of a plumbing system. The inlet fitting and plumbing outlet pipe connection has usually taken the form of an externally threaded portion, or solder, on either one of the inlet fitting or plumbing outlet pipe, with a matable internally threaded portion on the other end of the connection.

These conventional means for installing a faucet to an outlet pipe of a plumbing system require that the installer modify the outlet pipe to mate with the inlet fitting of the faucet. This modification of the outlet pipe requires an expenditure of labor and time. Therefore, there is a need for a simplified means of installing a faucet on an outlet pipe of a plumbing system.

An object of this invention is to provide a hydrant with a slip clutch assembly which is fully effective, adjustable-in-place, and sufficiently low in manufacturing cost to enable its use in low end plumbing as well as high end plumbing.

Another object of this invention is to provide such a slip clutch assembly which can be readily installed even as a retrofit unit on existing faucets.

It is a further object of this invention to provide such a slip clutch assembly which can be readily contractibly and expandibly adjusted a controlled amount utilizing a release device.

These and other objects will be apparent to those skilled in the art.

SUMMARY OF THE INVENTION

A hydrant for use with a plumbing outlet pipe has a fluid passage passing from an inlet end to an outlet end and a retention body connected to the inlet end. A one-way slip clutch adapted to contractibly receive the pipe and prevent reverse pipe movement therethrough is located within the retention body. The slip clutch comprises a retaining ring having a plurality of sloped spring fingers normally allowing pipe movement in a linkage-contracting direction but preventing reverse pipe movement. The retention body is optionally integrally formed as a portion of the hydrant, placed within a cavity in the hydrant, or includes a threaded fitting removably mated with a corresponding threaded surface on the inlet end. A deactuator has a nose sized to engage the fingers to shift the fingers against their inherent bias to allow reverse pipe movement. A second retention body may be connected to the outlet end.

DESCRIPTION OF THE PREFERRED EMBODIMENT

Figure 1:
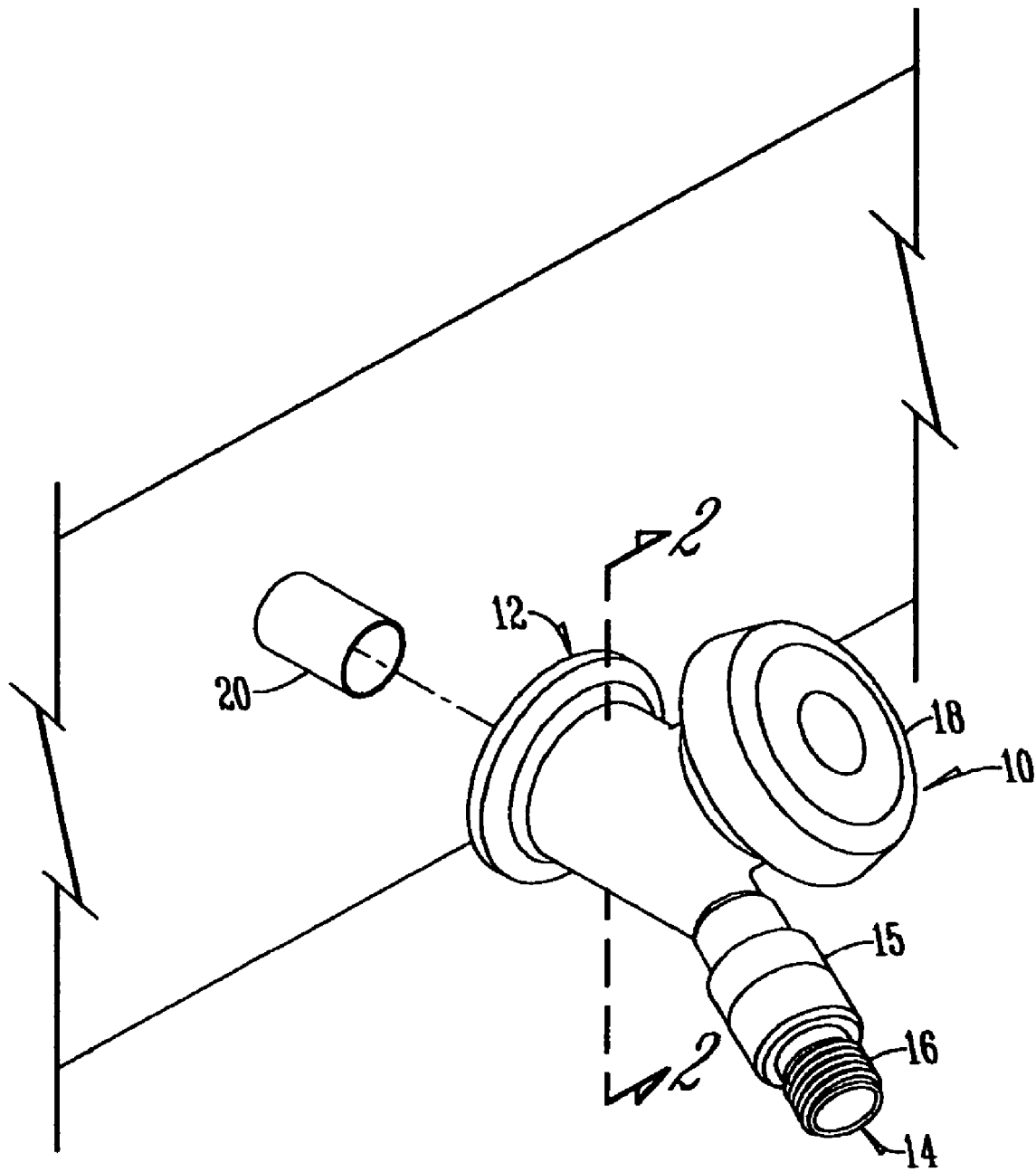
FIG. 1 is a perspective view of one embodiment of this invention.

With reference to FIG. 1, a wall hydrant 10 has an inlet end 12 and a threaded nozzle outlet 14, shown here as including a vacuum breaker 15. The threads on nozzle 14 are designated by the numeral 16. A valve control handle 18 extends outwardly from hydrant or faucet 10 and its rotation in one direction closes fluid flow, and rotation in the other direction opens the hydrant or faucet 1o to allow fluid flow through nozzle 14.

Figure 8:
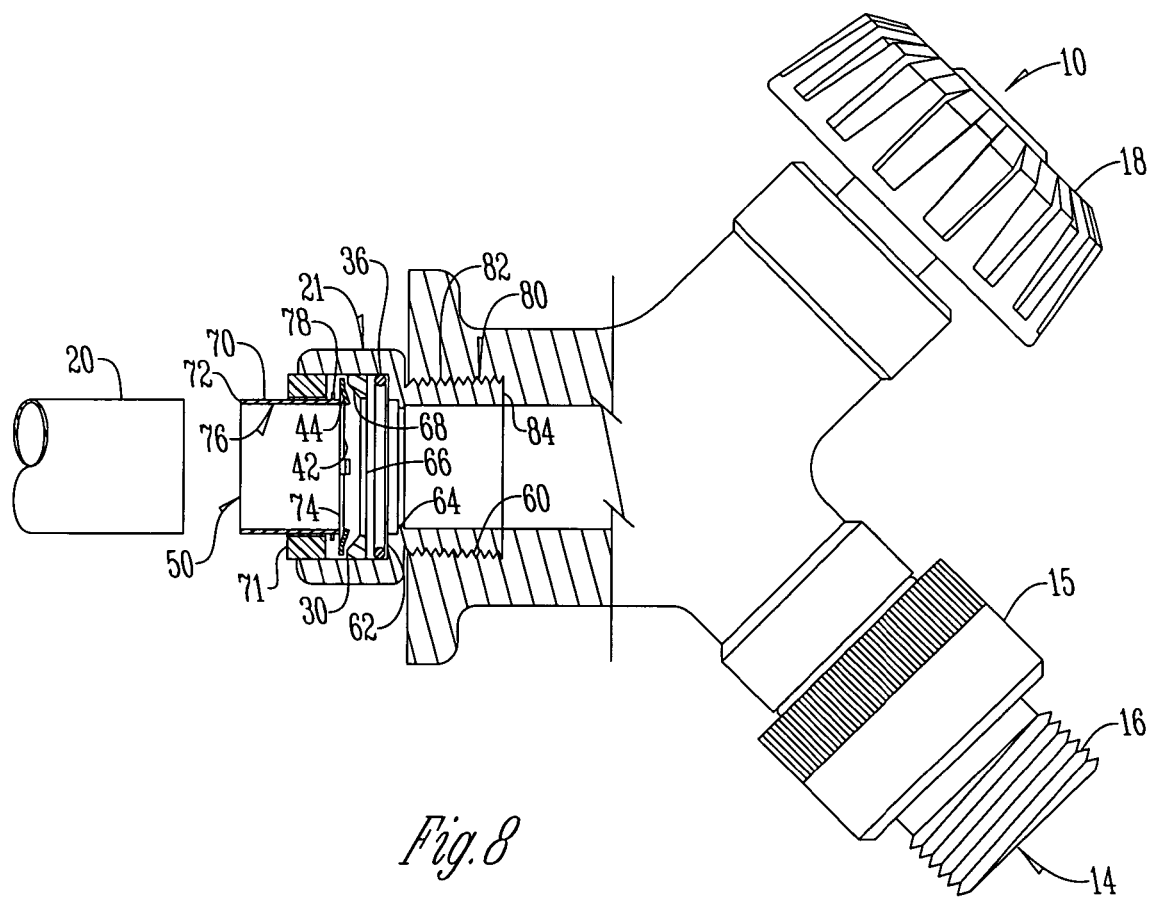
FIG. 8 a partial cross sectional side view of another embodiment of this invention taken on line 2—2 of FIG. 1, where the slip clutch of this invention is externally threaded and removably attached to the inlet of faucet of FIG. 1.

As used herein the terms faucet and hydrant include, but are not limited to faucets, hydrants, and the like. Additional description of the hydrant 10 of the present invention is found in: U.S. Pat. Nos. 4,532,953; 5,246,028; 5,590,679; 5,632,303; 5,701,925; 6,135,359; 6,142,172; 6,206,039; 6,532,986; 6,883,534; 6,857,442; 6,830,063; 6,805,154; the disclosures of which are expressly incorporated herein by reference in their entirety. For example, hydrant 10 may be a freezeless wall hydrant as shown in FIG. 8, or any other suitable hydrant design.

To be installed, the wall hydrant 10 is fastened to plumbing outlet pipe 20. Once installed, water will flow from the plumbing outlet pipe 20, into the inlet end 12 and out nozzle outlet 14 when the valve control handle 18 is actuated.

Figure 2:
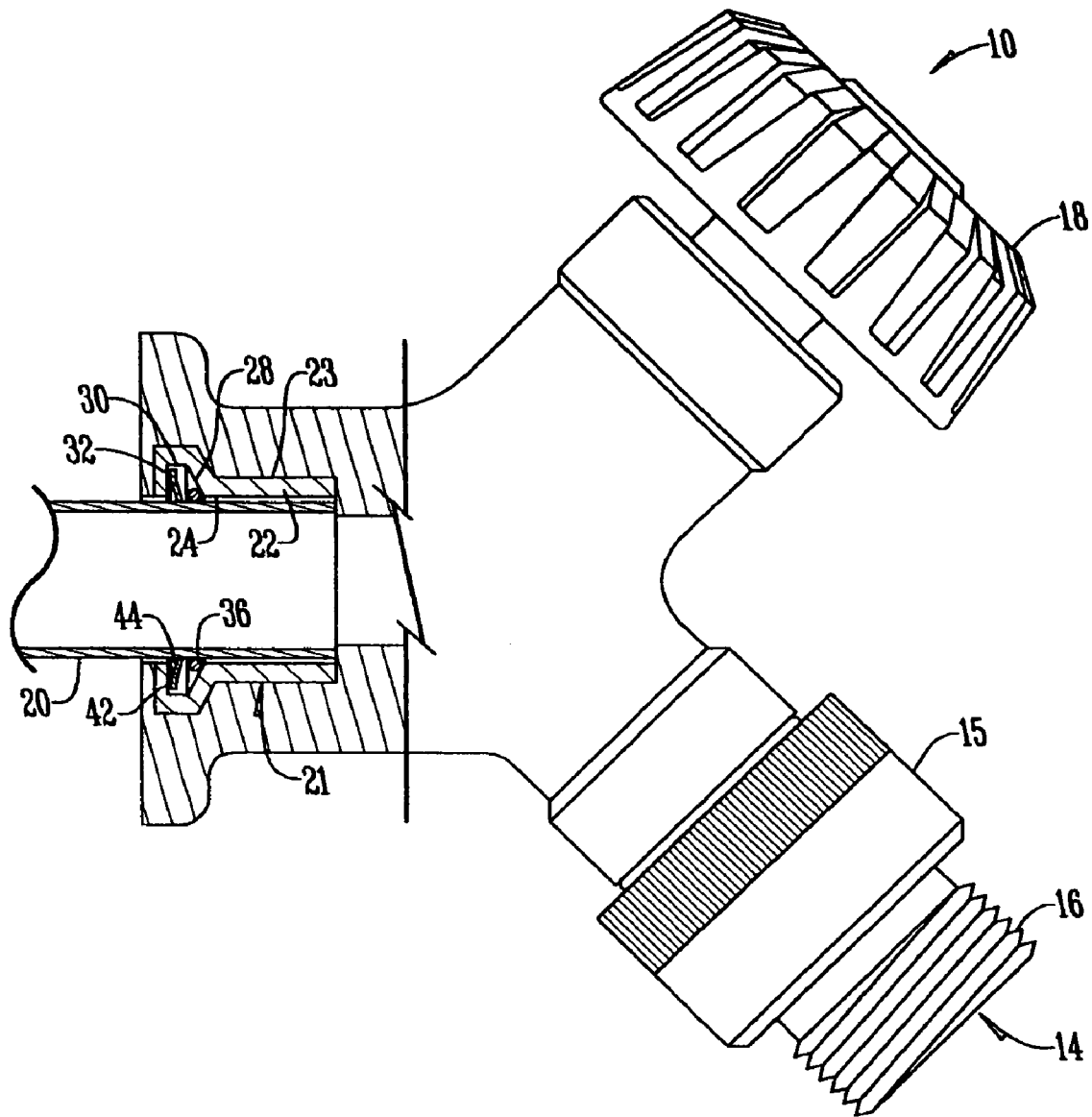
FIG. 2 is a partial cross sectional side view of this invention taken on line 2—2 of FIG. 1.

With reference to FIG. 2, a slip clutch assembly 21 includes a retention body 22 formed to be matably received within a cavity 23 located within the inlet end 12 of the wall hydrant 10. The slip clutch retention body 22 is shown to be generally cylindrical on its exterior, and formed to have an axial passage 24 therethrough. The inlet end of body 22 includes an annular, frustoconical, radially-inwardly tapered cavity portion 28 and a generally cylindrical cavity 30 formed adjacent thereto. At the inlet end the body has an internally extending flange 32 defining part of the cavity 30. One skilled in the art will understand that the cavity portion 28 does not have to taper and could be in any shape that allows the functional advantages of this device. During assembly, an O-ring 36 is placed within frustoconical cavity 28, and a retaining ring 42 is placed between the O-ring 36 and the flange 32. Flange 32 is peened radially inwardly over the retaining ring 42 to capture the retaining ring 42 and O-ring 36 in a compressed fashion causing the O-ring 36 to be axially and radially compressed so as to bear against the adjacent plurality of upwardly, radially-inwardly extending, sloped spring fingers 44 (See FIGS. 4 and 5). The tapered upper surface of the frustoconical cavity 28 tends to compress the O-ring 36 axially and radially against the outside surfaces of the sloping spring fingers 44.

Figure 4:
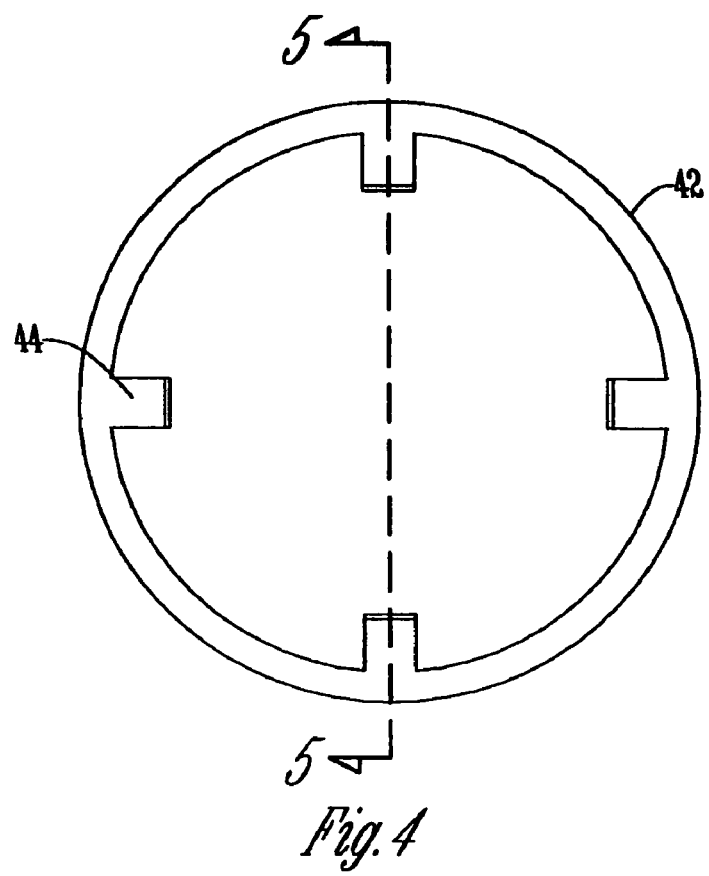
FIG. 4 is a top view of the retaining ring portion of the slip clutch of this invention.
Figure 5:
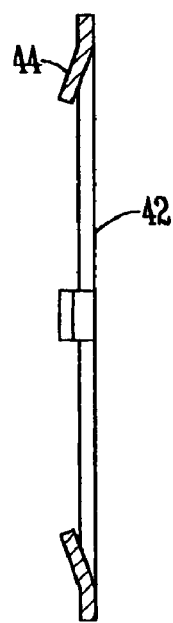
FIG. 5 is a cross sectional side view of the retaining ring of this invention taken on line 5—5 of FIG. 4.

With reference to FIGS. 4 and 5, the spring fingers 44 are shown at equally spaced ninety degree intervals around the retaining ring 42; however, additional spring fingers 44 may be used at any given interval around the retaining ring 42 without departing from the present invention. The plurality of spring fingers 44, integral with the retaining ring 42, have inherent resilience to be biased into tight engagement with the peripheral surface of plumbing outlet pipe 20. The angularly oriented spring fingers 44 will allow the plumbing outlet pipe 20 to move horizontally through the fingers 44 in one direction, but will frictionally engage into the surface of the plumbing outlet pipe 20 retain the outlet pipe 20 and to resist the removal of the plumbing outlet pipe 20.

With reference to FIG. 2, positioned between the retaining ring 42, and specifically the spring fingers 44 thereof, and the frustoconical cavity 28 is the other biasing means shown in the form of a resilient object such as a compressible O-ring 36, or any other such resilient object, which is compressed between the frustoconical surface 28 and the fingers 44. The compressed O-ring 36 forms a seal against the outer surface of plumbing outlet pipe 20, when the pipe 20 is inserted into slip clutch assembly 21. Additionally, the compressed O-ring 36 has been found to not only add further bias to the fingers 44 radially inwardly into engagement with the peripheral cylindrical surface of plumbing outlet pipe 20, but to also act as a balancing means to cause the stress on each of the plurality of fingers 44 to be substantially equal. The function and useful life of the retaining ring 42 have been found to be significantly better and longer, respectively, when the O-ring 36 was combined with the retaining ring 42 in the assembly. One skilled in the art will appreciate that the pipe can be releasably secured by the fingers 44 or permanently secured within the fingers 44.

Figure 6:
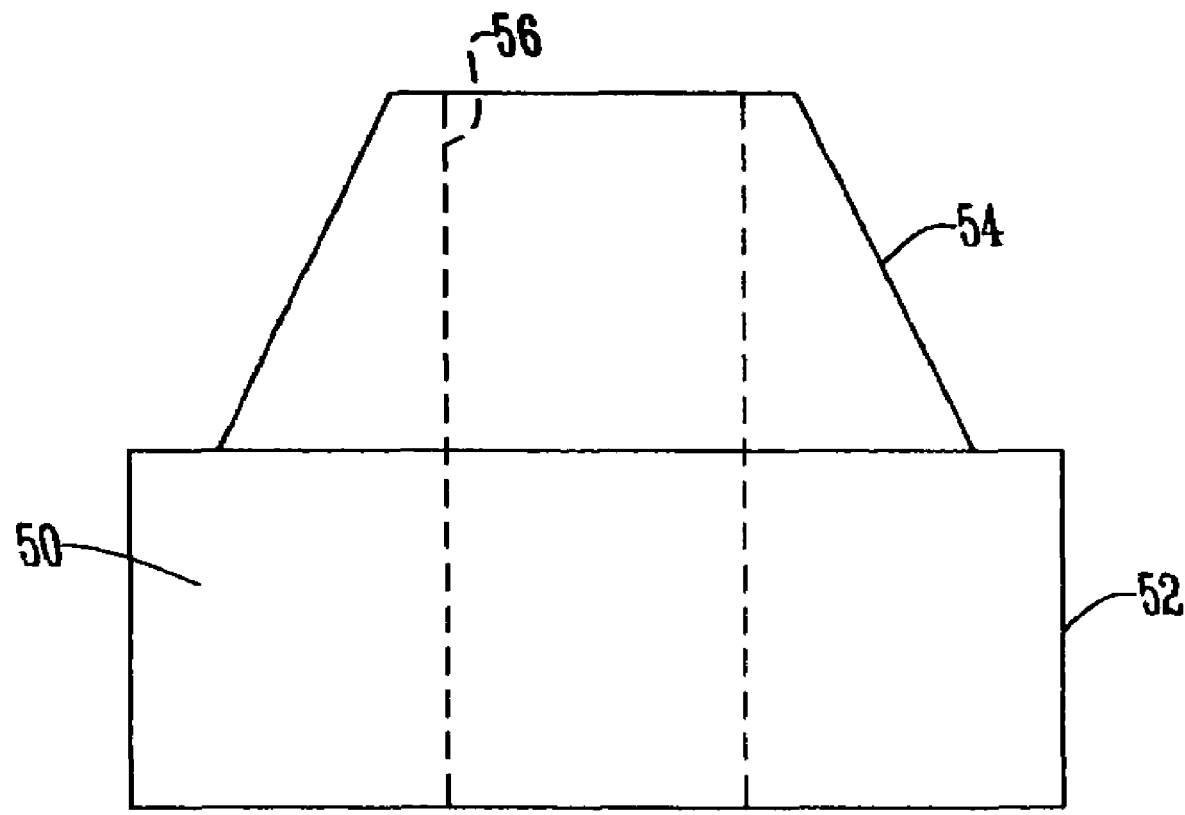
FIG. 6 is a side view of the slip clutch deactuator of this invention with hidden lines.

With reference to FIG. 6, also positioned around plumbing outlet pipe 20 exterior to body 22 and retaining ring 42, and movable axially along the plumbing outlet pipe 20, is a slip clutch deactuator 50 which is shown to be a ring which includes an annular lower portion 52 and an upwardly protruding frustoconical upper portion 54 (or nose) which tapers radially-inwardly-upwardly. This deactuator has a central orifice 56 that receives plumbing outlet pipe 20 so that the deactuator 50 can be manually moved along plumbing outlet pipe 20 to engage the tapered inside surfaces of spring fingers 44. The axial force of deactuator 50 against the spring fingers 44 causes the spring fingers 44 to move radially outwardly and upwardly to release their compressive force on plumbing outlet pipe 20, to allow the plumbing outlet pipe 20 and body 22 to be withdrawn from the slip clutch assembly 21, i.e., to remove the wall hydrant 10 from the plumbing outlet pipe 20.

Figure 3:
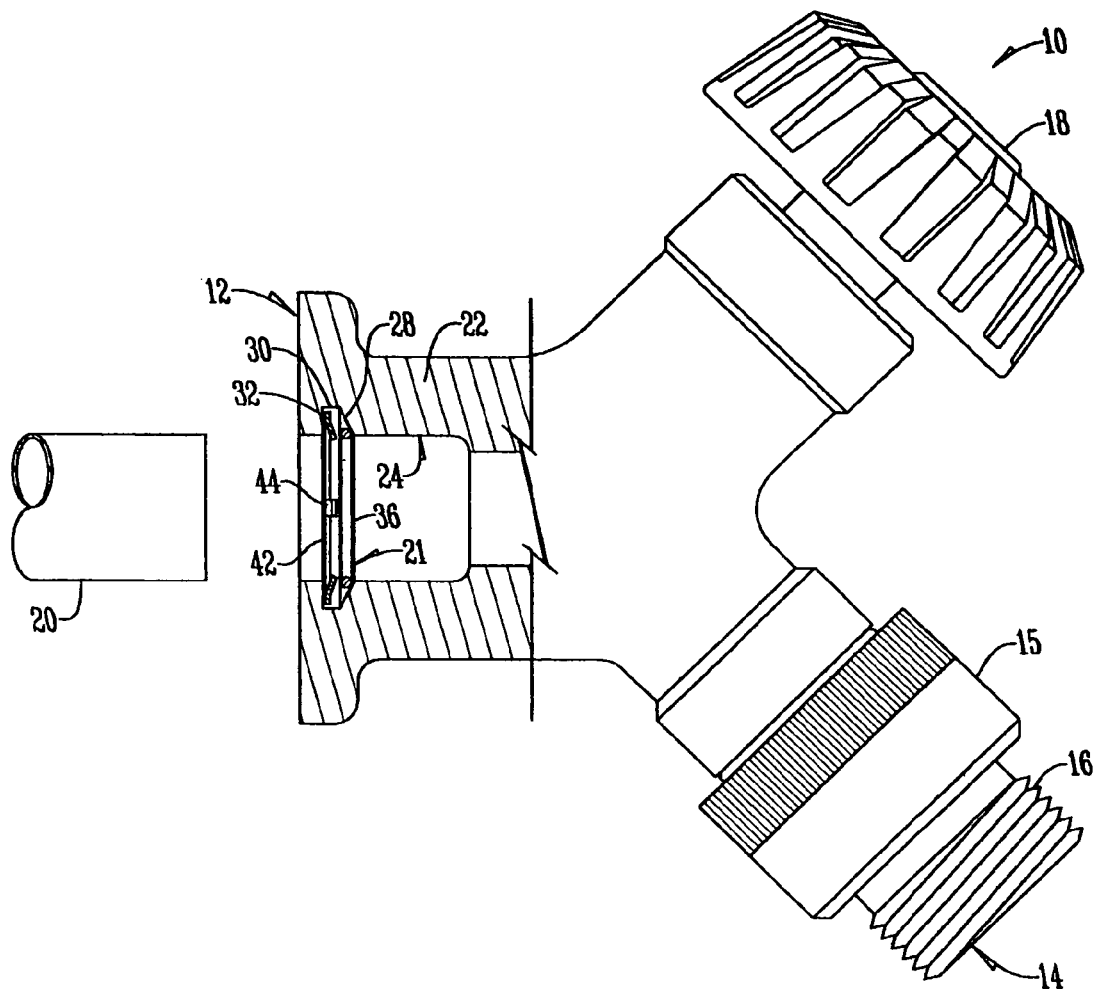
FIG. 3 is a partial cross sectional side view of another embodiment of this invention taken on line 2—2 of FIG. 1.

With reference to FIG. 3, an alternative structure for slip clutch assembly 21 is shown. In this embodiment, the slip clutch assembly 21 includes retention body 22 formed integrally within the inlet end 12 of the wall hydrant 10; whereas in FIG. 2 the retention body 22 is independently formed and is matably received within a cavity 23 in the wall hydrant 10. As in the embodiment of FIG. 2, the slip clutch retention body 22 is formed to have an axial passage 24 therethrough. The inlet end of body 22 includes an annular, frustoconical, radially-inwardly tapered cavity portion 28 and a generally cylindrical cavity 30 formed adjacent thereto, cavity 30 being partially defined by flange 32. During assembly, an O-ring 36 is placed within frustoconical cavity 28, and a retaining ring 42 is placed between the O-ring 36 and the flange 32. Flange 32 is formed as a part of the inlet end 12 of the wall hydrant 10 to capture the retaining ring 42 and O-ring 36 in a compressed fashion causing the O-ring 36 to be axially and radially compressed so as to bear against the adjacent plurality of upwardly, radially-inwardly extending, sloped spring fingers 44.

Figure 7:
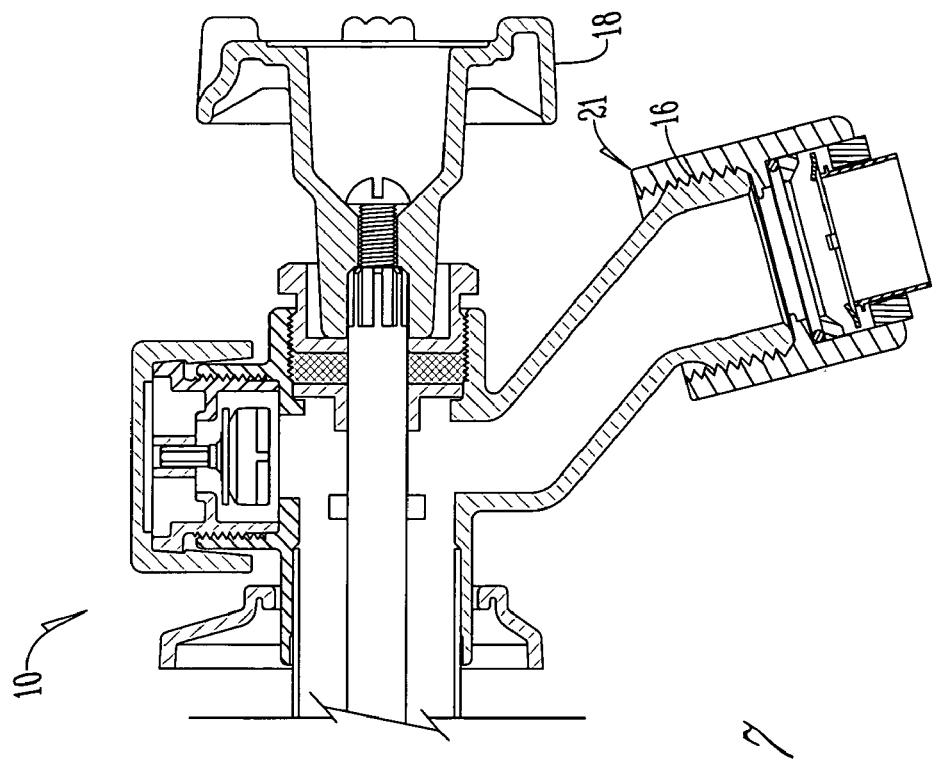
FIG. 7 is a partial cross sectional side view of another embodiment of this invention, where the slip clutch of this invention is internally threaded and removably attached to the inlet of a freeze protected faucet.
Figure 7:
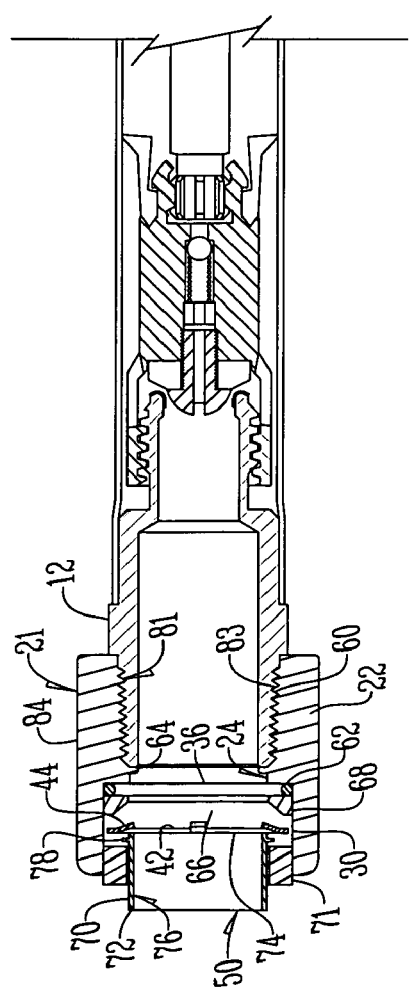

With reference to FIGS. 7 and 8, an alternative structure for slip clutch assembly 21 is shown. In this embodiment, slip clutch assembly 21 includes a retention body 22 formed as a separate piece to be matably and removably attached to a threaded surface 60 of the inlet end 12 of the wall hydrant 10.

The slip clutch retention body 22 is shown to be generally cylindrical on its exterior, and formed to have an axial passage 24 therethrough. The inlet end of body 22 includes a generally cylindrical cavity 30 extending from the inlet end to an end wall 62 extending annularly from the cavity 30. The end wall 62 includes a rib portion 64 extending annularly from the end wall 62, which forms a barrier to stop a plumbing outlet pipe 20 from being inserted past the rib portion 64. The cavity 30 is partially enclosed being surrounded by rim 71, formed as a plastic ring affixed to the inlet end of cavity 30.

During assembly, an O-ring 36 is placed within cavity 30 adjacent the end wall 62. An annular, frustoconical, radially-inwardly tapered ring 66 having a frustoconical, radially-inwardly tapered surface 68 is placed within cavity 30 adjacent the O-ring 36. The frustoconical ring 66 is affixed to the inlet end of cavity 30 to capture the O-ring 36 between the frustoconical ring 66 and the end wall 62, causing the O-ring 36 to be axially and radially compressed.

A retaining ring 42 is placed within cavity 30 adjacent the frustoconical ring 66 to place the frustoconical ring 66 between the retaining ring 42 and the O-ring 36. A slip clutch deactuator 50 is placed within cavity 30 adjacent the rim 71 so as to be positioned between the rim 71 and the retaining ring 42. Rim 71 is affixed to the inlet end of cavity 30 to capture the deactuator 50 and retaining ring 42 between the rim 71 and the frustoconical ring 66.

The tapered surface 68 of the frustoconical ring 66 prevents the sloping spring fingers 44 from being deformed when plumbing outlet pipe 20 is inserted into slip clutch assembly 21. As described in greater detail above, with reference to FIGS. 4 and 5, these spring fingers 44 allow the plumbing outlet pipe 20 to move through the fingers 44 in one direction, but will frictionally engage into the surface of the plumbing outlet pipe 20 to retain the outlet pipe 20 and to resist the removal of the plumbing outlet pipe 20.

Positioned between the frustoconical ring 66, and the end wall 62 is a resilient material such as rubber that in this embodiment forms compressible O-ring 36, which is compressed between the frustoconical ring 66 and the end wall 62. The compressed O-ring 36 forms a seal against the outer surface of plumbing outlet pipe 20, when the pipe 20 is inserted into slip clutch assembly 21.

The slip clutch deactuator 50 is shown in this embodiment to be formed of a cylindrical body 70, with an external ring 72 on the inlet end of the cylindrical body 70 extending beyond a rim 71, a deactuation ring 74 (or nose) on the outlet end of the cylindrical body 70 adjacent the retaining ring 42, and formed to have an central orifice 76 therethrough passing from the external ring 72 to the deactuation ring 74. The central orifice 76 receives plumbing outlet pipe 20 so that the plumbing outlet pipe 20 may be received within the slip clutch assembly 21. The deactuator 50 can be readily manually moved along plumbing outlet pipe 20 so as to be placed into engagement with the tapered inside surfaces of spring fingers 44. By applying axial force to the external ring 72 of the deactuator 50, the deactuation ring 74 will move against inherent bias of the spring fingers 44, causing the spring fingers 44 to move radially outwardly and upwardly to release their compressive force on plumbing outlet pipe 20, and to allow the plumbing outlet pipe 20 and body 22 to be withdrawn from the slip clutch assembly 21, i.e., to remove the wall hydrant 10 from the plumbing outlet pipe 20. The deactuator 50 also includes a lip 78 extending annularly from the outer surface of the cylindrical body 70 adjacent the deactuation ring 74. The lip 78 is positioned between the rim 71 and the retaining ring 42, so as to slidably retain the deactuator 50 within the cavity 30 of retention body 22.

With reference to FIG. 8, as discussed above, the hydrant 10 may be a freezeless wall hydrant, or any other suitable hydrant design. The slip clutch assembly 21 as shown is designed be matably and removably attached to the freezeless wall hydrant 10 by a male threaded fitting 80. Alternatively, a female threaded fitting 81 (FIG. 7) is used. However, any other means disclosed herein may be used to adapting the freezeless wall hydrant 10 to include the slip clutch assembly 21, such as: 1) forming the slip clutch assembly 21 integrally with the freezeless wall hydrant 10 (as illustrated in FIG. 3), 2) inserting the slip clutch assembly 21 within a cavity 23 within the freezeless wall hydrant 10 (as illustrated in FIG. 2), or 3) providing a slip clutch assembly 21 designed be matably and removably attached to the wall hydrant 10 by a male threaded fitting 80 (as illustrated in FIG. 8)

With reference to FIGS. 7 and 8, the slip clutch assembly 21 is designed be matably and removably attached to the wall hydrant 10 by a fitting 80 or 81. In the embodiment of FIG. 7, the fitting 81 is formed as a female threaded surface 83 along a cylindrical outlet end 84 of the slip clutch assembly 21. The female threaded surface 83 removably mates with a corresponding male threaded surface 60 on the inlet end 12 of the wall hydrant 10. Likewise, in the embodiment of FIG. 8, the fitting 80 is formed as a male threaded surface 82 along a cylindrical outlet end 84 of the slip clutch assembly 21. The male threaded surface 82 removably mates with a corresponding female threaded surface 60 on the inlet end 12 of the wall hydrant 10.

With reference to FIG. 7, the slip clutch assembly 21, in addition to being associated with the inlet end 12 of the wall hydrant 10, may additionally or alternatively be associated with the outlet nozzle 14 of the wall hydrant 10. As shown, the fitting 81 is formed as a female threaded surface 83 along a cylindrical outlet end 84 of the slip clutch assembly 21. The female threaded surface 83 removably mates with a corresponding male threaded surface 16 on the outlet nozzle 14 of the wall hydrant 10. Alternatively, the slip clutch assembly 21 may be associated to the outlet nozzle 14 of the wall hydrant 10 in a manner similar to that illustrated in FIG. 2 (as an insert within in the outlet nozzle 14), FIG. 3 (as an integral portion of the outlet nozzle 14), and FIG. 8 (with a male threaded fitting 80 mated with a corresponding female threaded fitting on the outlet nozzle 14) . The use of slip clutch assembly 21 on outlet nozzle 14 of the wall hydrant 10 advantageously allows a pipe 20 (or similarly shaped tubing portion) to be slidably attached to the outlet nozzle 14 by slip clutch assembly 21.

In operation, the wall hydrant 10 and slip clutch assembly 21 permit quick and easy installation of the wall hydrant 10 onto the plumbing outlet pipe 20. To be installed, the wall hydrant 10 is fastened to plumbing outlet pipe 20. Once installed, water will flow from the plumbing outlet pipe 20, into the inlet end 12 and out nozzle outlet 14 when the valve control handle 18 is actuated. The retention body 22 of slip clutch assembly 21 removably receives and affixes to plumbing outlet pipe 20 when the plumbing outlet pipe 20 inserted into the axial passage 24 in the retention body 22. As the plumbing outlet pipe 20 is inserted into axial passage 24, the spring fingers 44 of retaining ring 42 flex to allow the plumbing outlet pipe 20 to pass within the retaining ring 42.

The spring fingers 44 of retaining ring 42 have inherent resilience to be biased into tight engagement with the peripheral surface of plumbing outlet pipe 20. The angularly oriented spring fingers 44 allow the plumbing outlet pipe 20 to move through the fingers 44 in one direction, but frictionally engage into the surface of the plumbing outlet pipe 20 to retain the outlet pipe 20 and to resist the removal of the plumbing outlet pipe 20. Once the plumbing outlet pipe 20 is inserted into axial passage 24, the compressed O-ring 36 forms a seal against the outer surface of plumbing outlet pipe 20. Thus the wall hydrant 10 and slip clutch assembly 21 permit quick and easy installation of the wall hydrant 10 onto the plumbing outlet pipe 20. For removal of the wall hydrant 10 and slip clutch assembly 21 from the plumbing outlet pipe 20, the slip clutch deactuator 50 is manually moved along plumbing outlet pipe 20 so as to be placed into engagement with the tapered inside surfaces of spring fingers 44. By applying axial force of deactuator 50 against the spring fingers 44, against the inherent bias of the spring fingers 44, the spring fingers 44 are caused to move radially outwardly to release their compressive force on plumbing outlet pipe 20, to allow the plumbing outlet pipe 20 and body 22 to be withdrawn from the slip clutch assembly 21, i.e., to remove the wall hydrant 10 from the plumbing outlet pipe 20.

The novel combination has been found to work very effectively, and moreover is relatively inexpensive to manufacture, as well as being easily assembled and disassembled as needed. Conceivably those skilled in this field will readily see additional advantages and features, as well as certain minor modifications to suit particular installations. Hence, the invention is not intended to be limited specifically to the preferred embodiment set forth above as exemplary of this invention, but only by the scope of the appended claims and the reasonably equivalent structures to those defined therein.

It is therefore seen that this invention will accomplish at least all of its stated objectives.

I claim:

1. A hydrant used in combination with a pipe comprising:
 a hydrant body having a fluid passage passing from an inlet end to an outlet end;
 a slip clutch assembly connected to the inlet end, the slip clutch assembly adapted to retain the pipe;
 said slip clutch assembly comprises a retaining ring having a plurality of sloped spring fingers around said pipe;
 said fingers having inside surfaces toward said pipe and outside surfaces away from said pipe;
 said fingers having an inherent bias toward said pipe;
 said spring fingers having pipe engaging ends allowing pipe movement in a first direction therethrough but preventing reverse pipe movement therethrough in an opposite direction;
 a deactuator in engagement with said inside surfaces of said sloped fingers to shift said fingers against the inherent bias of the fingers to allow said reverse pipe movement;
 a rim affixed within the slip clutch assembly to capture the deactuator and the retaining ring; and
 wherein the deactuator is slidably retained between the rim and an annular ring.

2. The combination of claim 1, further comprising a biasing means within the slip clutch assembly between the retaining ring and an end wall of the slip clutch assembly.

3. The combination of claim 1, wherein the annular ring is frustoconically shaped.

4. The combination of claim 1, wherein the slip clutch assembly is placed within a cavity in the hydrant body.

5. The combination of claim 1, wherein the slip clutch assembly is integrally formed as a portion of the hydrant body.

6. The combination of claim 1, further comprising a threaded fitting on the slip clutch assembly removably mated with a threaded surface on the inlet end.

7. The combination of claim 1 further comprising a lip positioned between the rim and the retaining ring so as to slidably retain the deactuator within slip clutch assembly.

* * * * *